Patented Sept. 3, 1935

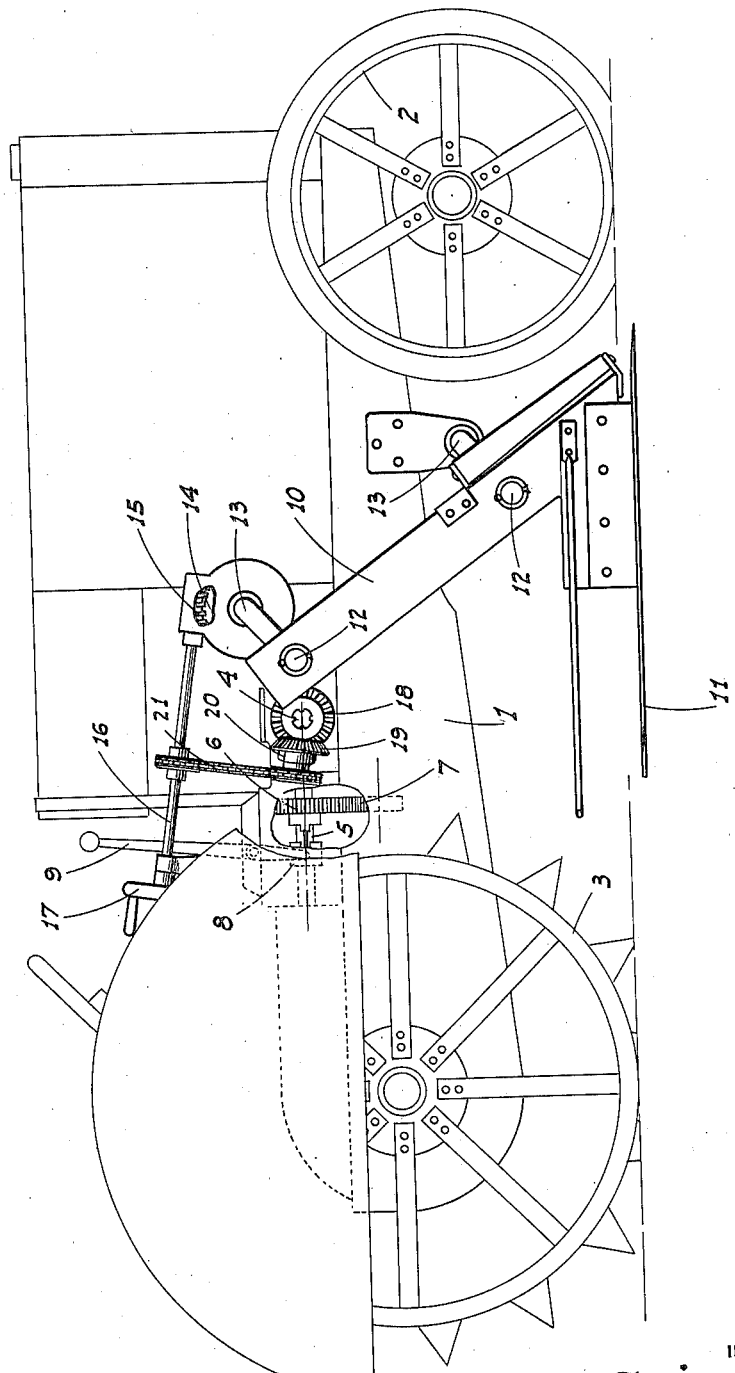

2,013,191

UNITED STATES PATENT OFFICE 2,013,191

POWER DRIVEN CONTROL FOR BEAN CUTTERS

Edmund M. Sciarini, Modesto, Calif.

Application October 1, 1934, Serial No. 746,296

1 Claim. (Cl. 97—50)

This invention relates to bean cutters and particularly to the bean cutting attachment adapted to be mounted on a tractor, and as shown in my copending application for patent, Serial No. 719,719, filed April 9, 1934.

In said original showing I only provided a hand means for raising and lowering the cutter. Since there are two opposed cutting units connected together and arranged to be simultaneously raised and lowered, and the weight of the combined unit is considerable, a gear reduction device was provided between the hand wheel and the rotary shaft by means of which the raising of the units is effected in order to reduce the physical effort necessary to thus manipulate the units. The raising or lowering operation is thus somewhat slow whereas it is sometimes desirable to manipulate the units in a rapid manner.

It is therefore the principal object of my present invention to provide a simple form of power means for actuating the raising and lowering mechanism which is driven from the power plant of the tractor itself at the option of the operator, and yet which does not interfere with the manipulation of the cutting units by hand when desired.

It is also an object of my invention to provide a mechanism for the purpose which does not require any alterations being made to the tractor itself and which may be easily connected to the tractor and to the original hand operated cutter controlling mechanism.

These objects I accomplish by means of such structure and relative arrangement of parts as will fully appear by a perusal of the following specification and claim.

The figure on the drawing is a side outline of a tractor of a certain type showing my improved bean cutter and the power control means for the cutter mounted thereon.

The tractor to which the cutter is attached comprises a main frame 1 supported at its front end by steerable wheels 2 and at its rear end by the drive wheels 3.

Included as a standard part of the equipment of the tractor is a power take-off shaft 4, projecting laterally from one side of the tractor a certain distance ahead of the drive wheels. This shaft is connected in driving relation with a jack shaft 5 on which a gear 6 is turnable, said gear being constantly engaged with a pinion 7 associated with and driven in connection with the transmission mechanism of the tractor.

A clutch element 8 adapted to selectively engage a similar element on the gear 6 is splined on the shaft 5, said element 8 being controlled by a hand lever 9. When the element 8 is engaged with the gear 6 therefore the shaft 5 is rotated and the shaft 4 is driven. When the clutch element is disengaged the shaft 4 is idle or it may be freely turned without restraint from the outside. As stated, this construction and arrangement is standard on the tractor and is merely briefly described to clearly show the selective control of the shaft 4.

The bean cutter as a whole comprises a pair of separate cutting units disposed on opposite sides of the frame 1 between the front and rear wheels. Each unit includes a rigid standard 10 extending to adjacent the ground and having a pair of rearwardly diverging cutting blades 4 of standard form and arrangement secured at their forward ends to the lower end of the standard.

The standard is supported for vertical adjustment on crank pins 12 turnably engaging the standard at spaced points in its length, said pins being formed on or rigid with vertically spaced cross shafts 13 suitably journaled in connection with the frame 1.

A worm gear 14 is secured to the upper shaft 13, which is above the level of the shaft 4, on that end of said shaft 13 which is on the same side of the tractor as that from which the shaft 4 projects.

The gear 14 is engaged by a worm 15 mounted on a shaft 16 extending rearwardly to a hand wheel 17 conveniently positioned for operation by the driver of the tractor.

Thus far the construction of the control mechanism is the same as that shown in the previous application, in which the hand control means alone was relied on for the vertical movement of the cutting units. A power controlled connection between the selectively operable take-off shaft 4 and the worm or hand shaft 16 is provided as follows: The usual pulley on the shaft 4 is removed and in its place I mount a bevel gear 18. This gear meshes with a similar gear 19 turnably mounted on a bracket 20 secured to the bearing housing of the shaft 4 or any other adjacent location in any suitable manner. The axis of the gear 19 is parallel to the shaft 16, thus placing said gear and the shaft 16 in position for convenient connection by means of an ordinary chain drive 21.

It will therefore be seen that when the shaft 4 is power driven upon properly manipulating the lever 9 the shaft 13 will be turned and the cutting units will be raised or lowered in a faster and more effortless manner than is possible by the rotation of the shaft 16 by hand. At the same time when the clutch element 8 is released so that the shaft 4 is freed the shaft 16 may be turned by hand; in which case the shaft 4 merely rotates by reason of the interconnecting mechanism, without any appreciable additional load being placed on the shaft 16 or the hand wheel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In combination with a tractor having a power take-off shaft, and means to selectively control the driving of said shaft; an implement, means mounting the implement on the tractor for vertical adjustment, hand means to thus adjust the implement and including a rotatable shaft extending in a plane at right angles to the take-off shaft, a bevel gear fixed on said take-off shaft, another bevel gear meshing with said first named gear and disposed with its axis parallel to the rotatable shaft, and drive means connecting said rotatable shaft and said other bevel gear.

EDMUND M. SCIARINI.